United States Patent [19]

Fachini et al.

[11] Patent Number: 5,237,802

[45] Date of Patent: Aug. 24, 1993

[54] LIFT SYSTEM FOR A COTTON HARVESTER

[75] Inventors: Robert M. Fachini, Naperville, Ill.;
John H. Chance, Amarillo, Tex.;
David Brandt, Downers Grove, Ill.;
Daniel A. Miller, Amarillo, Tex.

[73] Assignee: Case Corporation, Racine, Wis.

[21] Appl. No.: 828,355

[22] Filed: Jan. 30, 1992

[51] Int. Cl.⁵ ............................................. A01D 46/08
[52] U.S. Cl. .................................. 56/10.2; 56/15.2;
56/28
[58] Field of Search ............... 56/28, 15.2, 10.2, 30, 56/33, 36

[56] References Cited

U.S. PATENT DOCUMENTS

| | | | |
|---|---|---|---|
| 4,125,988 | 11/1978 | Schlueter | 56/30 |
| 4,229,931 | 10/1980 | Schlueter et al. | 56/10.2 |
| 4,249,365 | 2/1981 | Hubbard et al. | 56/13.2 |
| 4,307,560 | 12/1981 | Swanson | 56/208 X |
| 4,327,540 | 5/1982 | Swanson | 56/10.2 X |
| 4,335,561 | 6/1982 | Swanson et al. | 56/10.2 |
| 4,344,271 | 8/1982 | Schlueter et al. | 56/13.6 |
| 5,090,184 | 2/1992 | Garter et al. | 56/10.2 |
| 5,115,628 | 5/1992 | Garter et al. | 56/10.2 |

Primary Examiner—Terry Lee Melius
Attorney, Agent, or Firm—Rudnick & Wolfe

[57] ABSTRACT

A lift system for individually elevating one or more harvesting units of a cotton harvester through a range of movement extending between an operational position and a raised position while maintaining other harvesting units in an operational position relative to the harvester. The lift system includes a source of actuating fluid, a fluid pressure actuator connected to each harvesting unit for elevating a respective harvesting unit, and a control system connected between the source of actuating fluid and each fluid pressure actuator for selectively controlling the elevation of the harvesting units relative to the chassis of the harvester. The control system includes ground sensors for individually maintaining the harvesting units in a preselected elevational position relative to the harvester. The control system further includes a series of electro/hydraulic valves for independently interrupting and effectuating the flow of actuating fluid to the fluid pressure actuators thereby providing independent control over elevation of the harvesting units.

7 Claims, 3 Drawing Sheets

LIFT SYSTEM FOR A COTTON HARVESTER

FIELD OF THE INVENTION

The present invention generally relates to agricultural equipment and, more particularly, to a system for lifting harvesting units of a cotton harvester either individually or in unison relative to a chassis of the cotton harvester.

SUMMARY OF THE INVENTION

A cotton harvester typically has a harvesting head assembly including two or more harvesting units supported thereon in a cantilevered fashion. It has been heretofore known to provide a hydraulic lift system for raising and lowering the harvesting units by controlling extension and retraction of a hydraulic cylinder connected to each harvesting unit for that purpose.

Cotton grows on plants on or near the ground. The harvesting units, therefore, are positioned to follow as close to the ground as possible so as to remove or strip all of the cotton from the plants. The field or ground over which the harvester is driven is usually uneven. To compensate for changing ground contours, heretofore known lift systems further include a hydraulic height sensing system for automatically raising and lowering the harvesting units relative to a frame of the head assembly as the harvester is driven across the field.

These height sensing systems are known to include a ground engaging shoe or sensor supported on each harvesting unit. The sensor or shoe is mechanically linked to a control valve which continuously and adjustably varies the flow of hydraulic actuating fluid to the hydraulic cylinder connected to the harvesting unit thereby allowing each harvesting unit to "float" and be responsive to variations in the ground surface over which the harvester moves.

A typical lift system for a cotton harvester further includes a hydraulic actuating fluid source such as a hydraulic pump mounted on the harvester. A rotary flow divider is connected to the pump outlet and delivers actuating fluid to the hydraulic cylinders used to lift the harvesting units. The rotary flow divider includes a series of conjointly gear driven pumps which commonly receive hydraulic actuating fluid from the pump and provide a substantially equal flow of hydraulic actuating fluid into a series of flow passages leading to the hydraulic cylinders associated with the harvesting units.

During operation of the harvester, it is not uncommon for a need to arise wherein one of the harvesting units on the head assembly is to be elevated from an operating position to a raised position independently of the other harvesting units. With heretofore known lift systems using rotary flow dividers, elevating one harvesting unit to a raised position adversely affects elevation of the remaining harvesting units. Moreover, elevating one harvesting unit with heretofore known cotton harvester lift systems using a rotary flow divider detracts away from the ability of the other harvesting units to "float" as the harvester is driven across a field.

Thus, there is a need and a desire for a lift system which allows one or more of the harvesting units on a cotton harvester head assembly to be elevated from an operating position to a raised position independently of and while maintaining remaining harvesting units on the head assembly in an operative position relative to the frame of the harvester.

BRIEF DESCRIPTION OF THE INVENTION

In view of the above, and in accordance with the present invention, there is provided a system for independently elevating one or more harvesting units of a cotton harvester through a range of movement extending between an operational position and a raised position while maintaining other harvesting units in an operational position relative to the harvester. The lift system of the present invention includes a source of actuating fluid, a fluid pressure actuator connected to each harvesting unit for elevating the respective harvesting unit about a generally horizontal axis, and a control assembly connected between the source of actuating fluid and each fluid pressure actuator for selectively controlling the elevation of the harvesting units relative to a chassis of the cotton harvester. The control assembly includes ground sensor means carried by each harvesting unit for individually maintaining the harvesting units in a preselected elevational position relative to the harvester. The control assembly further includes a series of electrohydraulic valves for independently interrupting and effectuating the flow of actuating fluid to the fluid pressure actuators to allow independent control over elevation of the harvesting units.

In a most preferred form of the invention, the control assembly includes a valve body connected to the source of actuating fluid and including a series of flow passages which direct hydraulic fluid flows to the fluid pressure actuators in substantially equal amounts regardless of the relative elevation of the harvesting units. Each flow passage includes signal receiving means for adjusting the elevation of a respective harvesting unit as a function of the position of ground elevational signal transmitting means. The valve body further includes structure for controlling the rate at which each harvesting unit is lowered.

The harvesting units of the cotton harvester are mounted on a head assembly and extend transversely across the harvester. The lift system of the present invention further includes a fluid pressure operated mechanism for vertically moving the head assembly relative to the harvester thereby conjointly elevating the harvesting units thereon. In a most preferred form of the invention, the fluid pressure operated mechanism for moving the head assembly includes a pair of hydraulically actuated drivers arranged in a master/slave relation relative to each other.

The control assembly of the present invention maintains an equal flow of actuating fluid to each of the hydraulic cylinders throughout the range of travel of the harvesting units. Accordingly, one harvesting unit on the head assembly can be elevated to a fully raised position while maintaining an equal flow of hydraulic actuating fluid to the remaining harvesting units. The equal flow of hydraulic actuating fluid to the remaining harvesting units allows them to remain in a preselected position relative to the ground contour over which the harvester moves. Moreover, arranging the drivers of the fluid pressure actuated mechanism in a master/slave relationship relative to each other compensates for an imbalanced arrangement of harvesting units on the head assembly of the harvester.

Numerous other features and advantages of the present invention will become readily apparent from the following detailed description, the accompanying drawings, and the appended claims.

DETAILED DESCRIPTION OF THE PRESENT INVENTION

Figure 1:
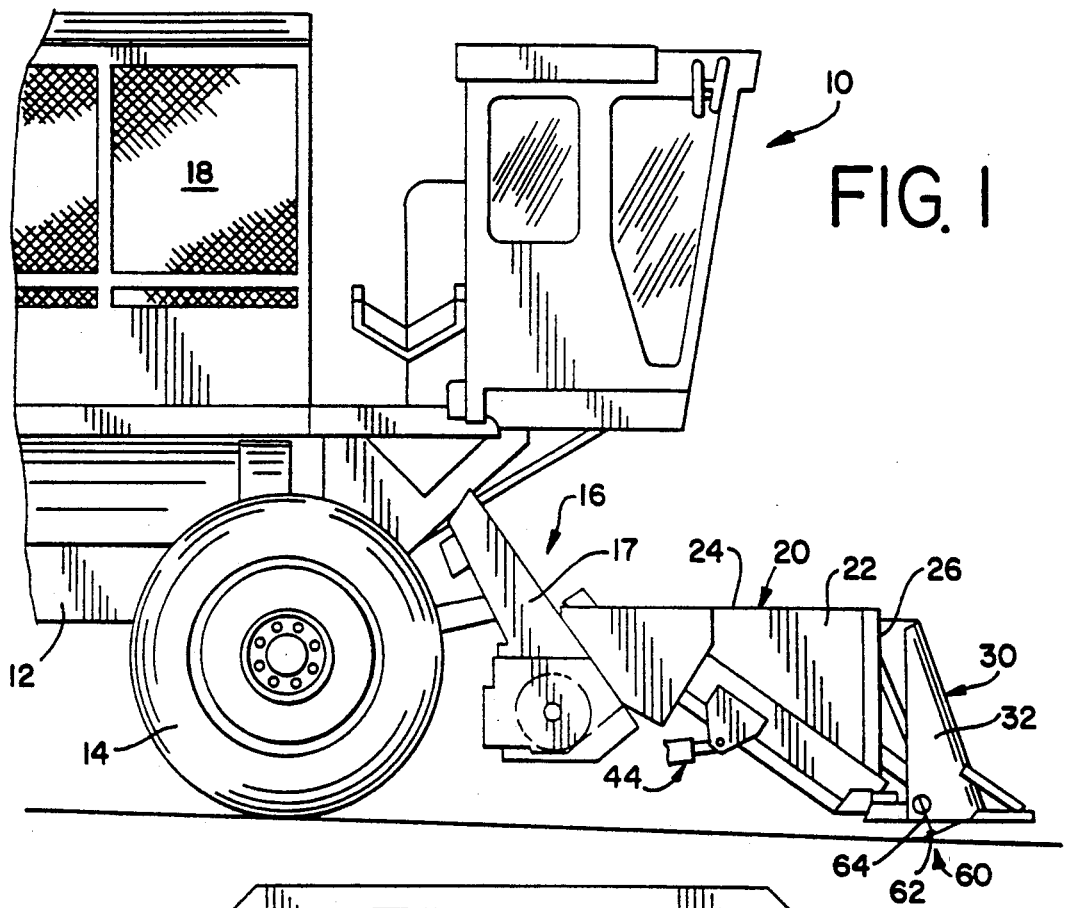
FIG. 1 is a fragmentary side elevational view of a cotton harvester embodying features of the present invention.

While the present invention is susceptible to embodiment in various forms, there is shown in the drawings a presently preferred embodiment hereinafter described with the understanding that the present disclosure is to be considered as an exemplification of the invention and is not intended to limit the invention to the specific embodiment illustrated.

Referring now to the drawings, wherein like reference numerals indicate like parts throughout the several views, in FIG. 1, there is schematically illustrated a portion of a cotton harvester 10 including a fore-and-aft extending mobile chassis or frame 12 supported for movement across a field of cotton plants by front and rear pairs of wheels 14, with only one wheel being illustrated for purposes of this description. A harvesting head assembly 16 is supported from the chassis ahead of the wheels 14 for harvesting cotton materials from generally parallel rows of cotton plants as the harvester is driven across the field. In the illustrated embodiment, a receptacle 18 is mounted on the chassis 12 for receiving cotton materials from the head assembly 16.

Figure 2:
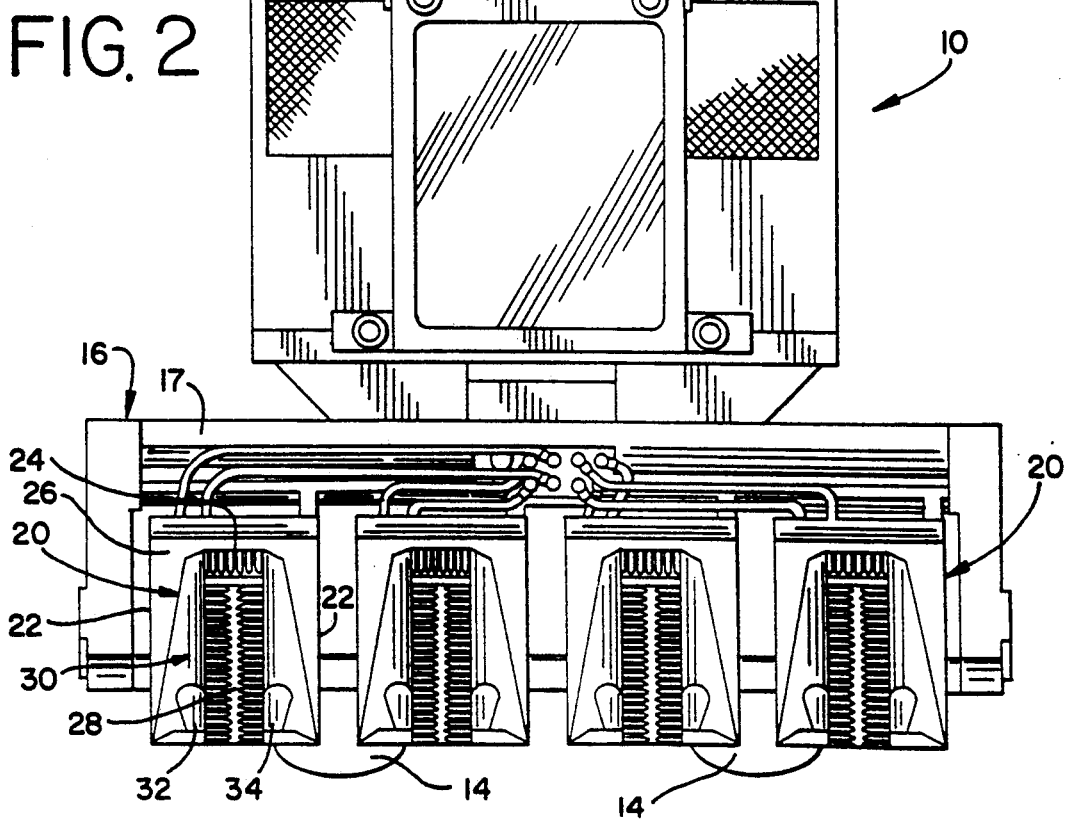
FIG. 2 is a front elevational view of the cotton harvester.

A plurality of harvesting units 20 are individually mounted on a frame 17 of the head assembly 16. Each harvesting unit 20 includes an upright housing structure that includes a harvesting mechanism (not shown) for removing or stripping cotton bolls from the plants as the harvester is driven across the field. As shown in FIGS. 1 and 2, each housing structure is composed of opposed side walls, such as shown at 22, an overhead horizontal panel 24, and front upright wall structure 26 that defines a central plant receiving passage 28 extending through the harvesting unit. Toward a rear end thereof, each harvesting unit 20 is conventionally mounted to the head assembly frame 17 in a cantilevered fashion such that it vertically moves about a generally horizontal axis relative to the ground surface over which the harvester moves.

A conventional crop gathering unit 30 extends forwardly from the housing structure of each harvesting unit. Each crop gathering unit 30 includes upright panel structure 32 and 34 arranged on opposite sides of the plant passage 28. The forward end of each gathering unit 30 is positioned relatively close to the ground over which the harvester moves.

Figure 3:
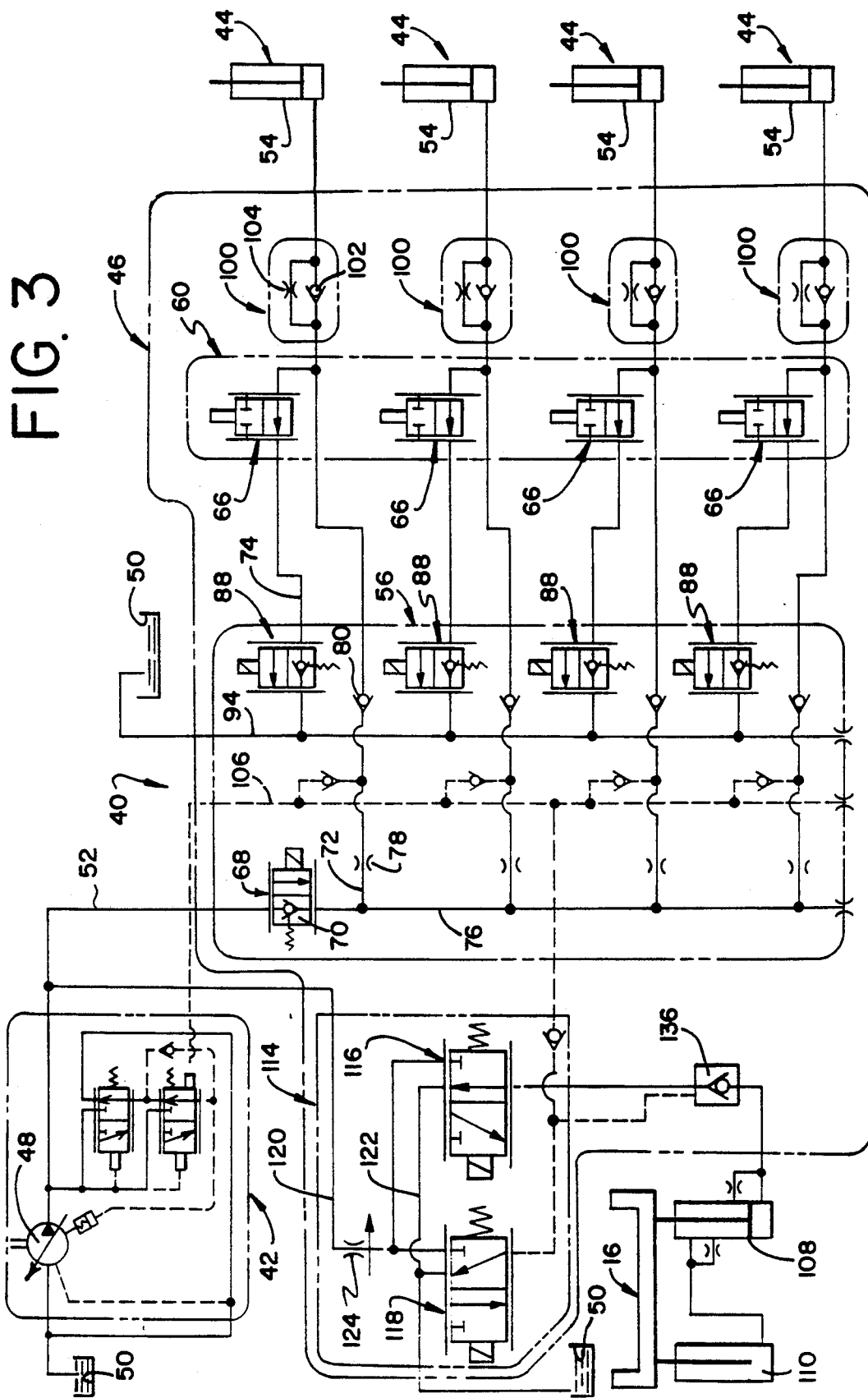
FIG. 3 is a schematic diagram of a cotton harvester lift system according to the present invention.

The elevation of the harvesting units 20 is controlled by a lift system schematically represented by reference numeral 40 in FIG. 3. The lift system 40 includes a source of actuating fluid 42, a fluid pressure actuator 44 connected to each harvesting unit for elevating a respective harvesting unit through a range of travel extending between an operative position and a raised position and relative to the chassis 12 of the harvester, and a control assembly 46 connected between the source of actuating fluid 42 and each fluid pressure actuator 44 for selectively controlling the elevation of the harvesting units relative to the chassis of the harvester and for maintaining an equal flow of actuating fluid to each of the fluid pressure actuators throughout the range of travel of each harvesting unit.

In the illustrated embodiment, the source of actuating fluid 42 preferably includes a variable displacement pump 48 which can be of a conventional design. Pump 48 is driven during operation of the harvester by a suitable power source on the harvester. The inlet of pump 48 is connected to a fluid reservoir 50 preferably arranged on the frame 12 of the harvester. During pump operation, an actuating fluid of sufficient pressure is exhausted from a pump outlet into a fluid supply line or conduit 52 connected to the pump outlet.

Each fluid pressure actuator 44 is of substantially similar structure. In the illustrated embodiment, each fluid pressure actuator 44 includes a linearly distendable hydraulic cylinder 54 having an inlet port opening to the piston end thereof. As will be appreciated, one end of each cylinder is connected to a respective harvesting unit. The other end of each cylinder is preferably attached to the frame 17 of the head assembly 16. As will be appreciated, the operative length of each cylinder controls the elevation of each harvesting unit relative to the harvester and relative to each other.

The control assembly 46 of the lift system preferably includes a valve body 56 suitably mounted on the harvester and which directs substantially equal amounts of hydraulic actuating fluid to each fluid pressure actuator 44 regardless of the elevation of the harvesting units relative to each other. The control assembly 46 further includes height sensing means 60 for automatically and variably adjusting the height of the harvesting units relative to the ground contour over which the harvester moves.

As shown in FIG. 1, the height sensing means 60 includes a ground engaging sensor or shoe 62 mounted on each harvesting unit and which rests on the ground. As is conventional, each shoe 62 vertically moves relative to the housing structure of each harvesting unit in response to changing ground contours. A linkage mechanism 64 vertically extends from a respective sensor and transfers movement of the shoe (reflective of ground contours) to a shiftable valve assembly 66 provided for each harvesting unit.

As shown in FIG. 3, the valve body 56 is connected to the supply conduit 52 leading from the actuating fluid source 42. In a preferred form of the invention, an automatic height control manifold valve 68 controls the flow of actuating fluid into the valve body 56. The manifold valve 68 is preferably designed as a two-position solenoid valve 70 which is responsive to operator controls from a cab region on the harvester.

The valve body 56 of the control assembly 46 further defines at least a portion of a fluid flow circuit extending to each hydraulic actuator 44. As will be appreciated, the number of fluid flow circuits will correspond to the number of harvesting units or the number of hydraulic fluid actuators 44 which are used to elevate one or more harvesting units independently of the adjacent harvesting units on the head assembly. Each fluid flow circuit includes an inlet passage 72 for directing actuating fluid toward a fluid pressure actuator in a manner raising a respective harvesting unit relative to a head assembly and an exhaust passage 74 for controlling the flow of actuating fluid from a fluid pressure actuator thereby influencing the operative length of a respective pressure actuator 44 and, thereby the elevation of the harvesting unit connected thereto. The valve body 56 is configured for attachments thereto whereby the number of fluid flow circuits can be readily modified from that illustrated in FIG. 3.

Since each fluid flow circuit associated with the control system is substantially similar, only one fluid flow circuit will be discussed in detail with the understanding that the other fluid flow circuits are similarly designed. As shown in FIG. 3, the inlet passage 72 of each fluid flow circuit receives actuating fluid from a common supply passage 76 leading from an outlet of the hydraulic control valve 68. An orifice 78 allows a preset volume of fluid to pass from the supply passage 76 and through passage 72 toward a respective hydraulic actuator 44. Downstream of orifice 78, a oneway check valve 80 is provided to allow fluid flow toward the hydraulic actuator while preventing fluid flow in a reverse direction.

Figure 4:
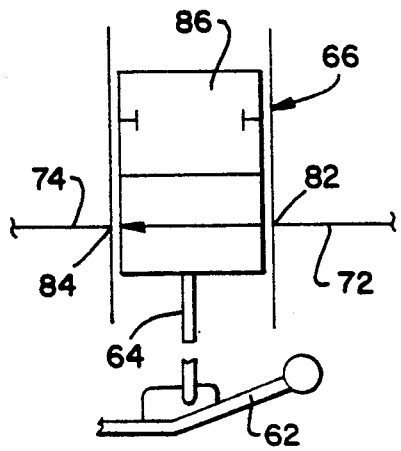
FIG. 4 is a schematic view of valve assembly associated with the lift system.

As shown in FIG. 4, the shiftable valve assembly 66 of the height sensing assembly 60 associated with each harvesting unit is connected to the inlet passage 72 and exhaust passage 74. Each valve assembly 66 includes an inlet port 82 connected between inlet passage 72 and an exhaust port 84 connected to exhaust passage 74. The flow of hydraulic fluid between ports 82 and 84 is controlled by a shifted valve element 86. The position of valve element 86, and thereby the flow of fluid between ports 82 and 84, is controlled by the vertical position of the ground sensor 62 relative to the respective harvesting unit.

A salient feature of the present invention concerns the ability to individually control elevation of each harvesting unit on the head assembly. To effect such ends, and as shown in FIG. 3, each fluid flow circuit further includes electro/hydraulic valve structure 88 for independently interrupting and effectuating the flow of actuating fluid to the fluid pressure actuator to allow independent control over elevation of one harvesting unit while maintaining other harvesting units on the head assembly in their preselected elevational position relative to the harvester.

Figure 5:
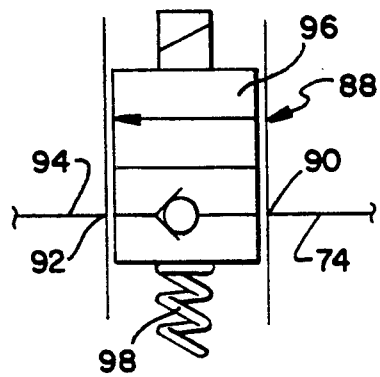
FIG. 5 is a schematic view of an electro/hydraulic valve assembly associated with the lift system.

As shown in FIG. 5, each electro/hydraulic valve structure 88 is preferably configured as a two position electrically responsive solenoid valve assembly which is controlled from a cab region of the harvester. In the illustrated embodiment, the valve of each valve structure 88 includes an inlet port 90 connected to the exhaust passage 74 and an exhaust port 92 which opens to a common exhaust 94 leading to reservoir 50 (FIG. 3). The flow of hydraulic fluid between ports 90 and 92 is controlled by a spring biased valve element 96.

In the illustrated embodiment, the valve element 96 of each valve structure 88 is biased under the influence of biasing means 98 into a closed position shown in solid lines in FIG. 5. In the closed position, the exhaust passage 74 leading from a respective hydraulic cylinder is closed to the exhaust 94. When the valve structure 88 is energized, valve element 96 moves against the action of the biasing means 98 to a position wherein the inlet port 90 is joined to port 92 thus allowing fluid from the respective hydraulic cylinder to be exhausted through line 94 to the reservoir 50.

Returning to FIG. 3, each flow path leading to a respective fluid actuator 44 is further configured with valve structure 100 for influencing the rate at which a respective harvesting unit is allowed to descend from an elevated position. In the illustrated embodiment, valve structure 100 preferably includes a one-way check valve 102 arranged along inlet passage 72 downstream of valve assembly 66 for allowing fluid flow toward the pressure actuator 44 and preventing flow in the opposite direction. To allow fluid flow in a direction opposite to that allowed by valve 102, an orifice 104 is provided. Fluid flow through orifice 104 is restricted thereby regulating the descent of the respective harvesting units associated with the fluid pressure actuator being controlled by the orifice control 104.

As mentioned above, pump 48 is preferably of a variable displacement type. Branching off each flow circuit associated with the hydraulic actuators 44 is a pilot passage 106. As is well known in the art, pilot passage 106 provides a fluid pressure signal to the source of actuating fluid 42 to influence the output of the variable displacement pump 48.

To promote elevation of all of the harvesting units in unison relative to each other, the lift system of the present invention further includes a pair of hydraulically actuated drivers 108 and 110 preferably arranged in a master/slave relationship relative to each other. Drivers 108 and 110 are connected to the chassis 12 of the harvester and are adapted to elevate the head assembly 16 and thereby conjointly move all the harvesting units arranged thereon relative to the chassis 12 of the harvester. As will be appreciated, the master/slave relationship of the actuating mechanisms 108 and 110 compensates for a weight imbalance of harvesting units across the frame of the harvester.

The control system 40 further includes a valve assembly 114 for regulating operation of the drivers 108 and 110 and thereby controlling elevation of all the harvesting units conjointly relative to the frame of the harvester. As shown in FIG. 3, valve assembly 114 is preferably configured with a pair of valves 116 and 118. A supply passage 120, leading from the outlet of fluid actuating source 42, directs actuating fluid to each valve 116, 118. An exhaust passage 122, which opens to reservoir 50, likewise extends from each valve 116, 118. An orifice 124 in supply passage 120 allows a preset volume of fluid to pass from the fluid actuating source 42 to each valve 116, 118 of valve assembly 114.

Figure 6:
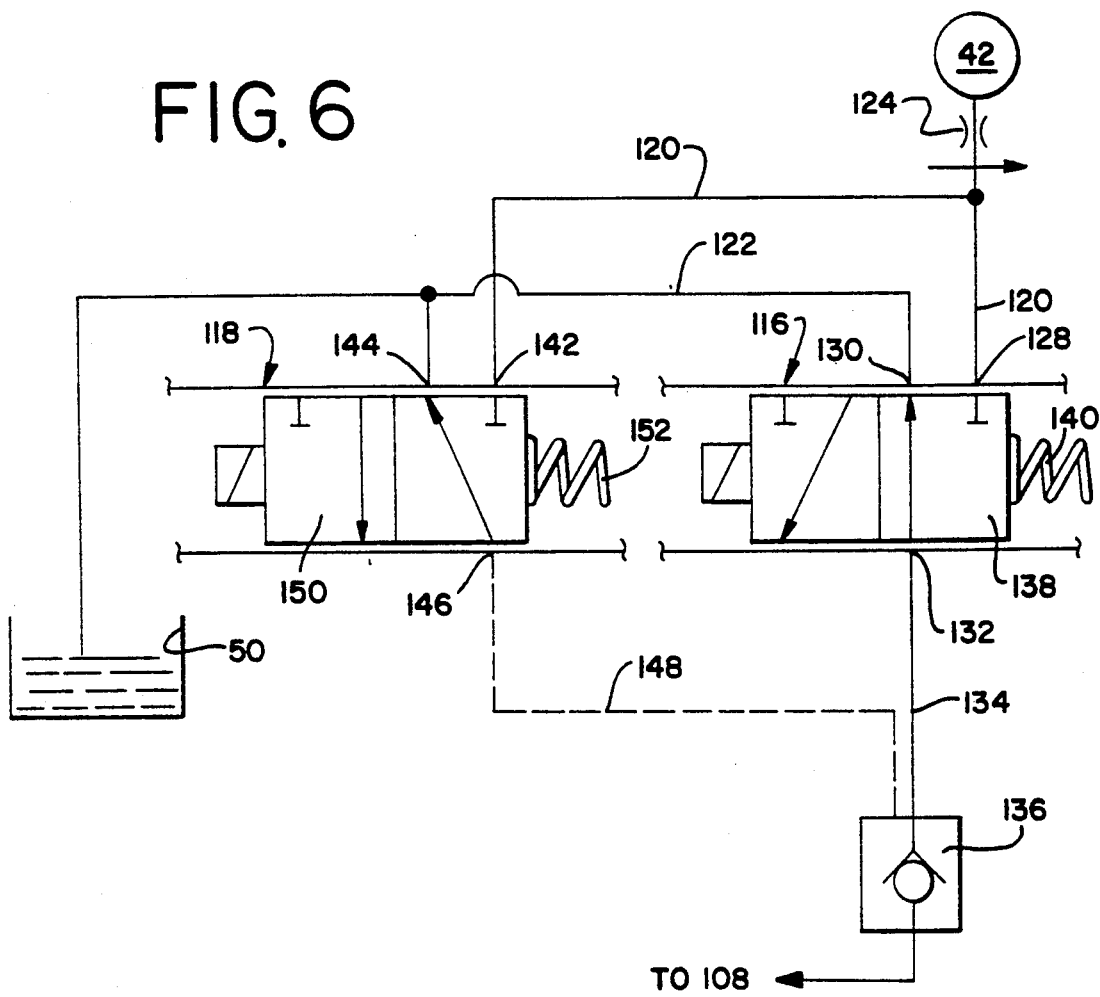
FIG. 6 is a schematic view of a valve assembly for selectively and conjointly controlling elevation of the harvesting units on the cotton harvester.

Turning to FIG. 6, valve 116 is preferably configured as a two-position electrically responsive solenoid valve which is controlled from a cab region on a harvester. In the illustrated embodiment, valve 116 includes an inlet port 128 connected to the supply passage 120, an exhaust port 130 connected to exhaust passage 122, and a motor port 132. A conduit 134 extends between port 132 of valve 116 and driver 108. For purposes to be described hereinafter, a one-way check valve 136 is arranged in combination with conduit 134 and is disposed between port 132 and driver 108. The flow of hydraulic fluid between ports 128, 130, and 132 is controlled by a spring biased valve element 138.

In the illustrated embodiment, valve element 138 of valve 116 is normally biased under the influence of biasing means 140 into the position shown in FIG. 6. In the position shown, motor port 132 communicates with the exhaust port 130. When valve 116 is energized, valve element 138 moves against the action of the biasing means 140 to a position wherein the inlet port 128 is joined to motor port 132 thus allowing actuating fluid to be delivered to the drivers 108, 110.

In the illustrated embodiment, valve 118 is likewise configured as a two-position electrically responsive solenoid valve which is controlled from a cab region on the harvester. In the illustrated embodiment, valve 118 includes an inlet port 142 connected to the supply passage 120, an exhaust port 144 which is connected to the common exhaust passage 122, and a motor port 146. A pilot line passage 148 extends between motor port 148 and check valve 136. The flow of hydraulic fluid between ports 142, 144, and 146 is controlled by a spring biased valve element 150.

In the preferred embodiment, valve element 150 of valve 118 is normally biased under the influence of biasing means 152 into the position shown in FIG. 6. With the valve element 150 in the position shown in FIG. 6, the pilot passage 148 is open to exhaust. When valve 118 is energized, valve element 150 moves against the action of the biasing means 152 to a position wherein the inlet port 142 is joined to port 146 thus allowing actuating fluid to be delivered through the pilot passage 148 to open the check valve 136.

The lift system of the present invention provides the operator of the harvester with several different options regarding the elevational position of the harvesting units. All the harvesting units 20 can be conjointly moved into an elevated position through selective actuation of the valve assembly 114 thereby vertically moving the frame 17 of the head assembly 16 and all of the harvesting units carried thereby.

In the illustrated embodiment, the head assembly 16 can be raised thus conjointly elevating the harvesting units by causing valve 116 of valve assembly 114 to shift from the position shown in FIG. 6 against the action of the biasing means 140. Thus, actuating fluid from source 142 will flow from port 128 across valve element 138 to motor port 132 and thence through valve 136 to drivers 108, 110. As will be appreciated, de-energization of valve 116 will cause valve 136 to close thus maintaining the head assembly 16 and all the harvesting units carried thereby in a selected elevational position.

In the illustrated embodiment, all the harvesting units on head assembly 16 can be conjointly lowered by causing valve 118 of valve assembly 114 to shift from the position shown in FIG. 6 against the action of the biasing means 152. Thus, actuating fluid from source 42 will flow from port 142 across valve element 150 to motor port 146 and thence into the pilot passage 148 thus effectively opening check valve 136. Opening check valve 136 will allow fluid from drivers 108, 110 to pass therethrough and into conduit 134. The fluid passing through 134 is presented to port 132 of de-energized valve 116 from whence the fluid enters into the exhaust passage 122 thus allowing the lowering of the harvesting units. As will be appreciated, once the head assembly and the harvesting units carried thereby are all lowered into a desired position, valve 118 is de-energized thus closing check valve 136 and thereby maintaining the head assembly and harvesting units in the selected elevational position.

Alternatively, all the harvesting units can be elevated together by conjointly actuating all the electro/hydraulic valves 88 disposed in the fluid flow leading from the actuators 44. On the other hand, the harvesting units 20 can be independently elevated relative to each other through selected actuation of a particular electro/hydraulic valve 88 associated with a particular harvesting unit thus allowing one harvesting unit to be vertically positioned relative to the remaining harvesting units.

Upon operation of the harvester, the height control manifold valve 68 is shifted from the solid line position shown in FIG. 3 to allow actuating fluid from source 42 to be directed into the common supply passage 76 of the valve body 56. Each fluid flow path in the valve body receives a preset volume of actuating fluid from the supply passage 76 and directs same toward the fluid pressure actuators 44 connected to each harvesting unit.

In a preferred form of the invention, a signal by the operator to energize master valve 68 likewise energizes each of the electro/hydraulic valves 88 associated with the fluid flow circuits for directing fluid relative to the actuators 44. Thus, the valve element 96 of each valve 88 moves against the action of biasing means 98 to connect exhaust passage 74 to the common exhaust 94. The operational height of each harvesting unit is thereafter determined by the height sensor assembly 60. As will be appreciated, the position of each valve assembly 66 associated with the height control system controls fluid flow through the exhaust passage 74 and thereby regulates the vertical elevation of the harvester and normally controls elevation of the harvesting units during operation of the harvester.

When one of the harvesting units is to be raised from an operational position to a raised position, the electro/hydraulic valve 88 associated with the particular fluid flow circuit leading to the actuator 44 associated with the harvesting unit to be raised is shifted to the solid line position shown in FIG. 3. Thus, the fluid flow from that particular actuator 44 is blocked from exhaust whereby the additional flow of actuating fluid directed toward the actuator 44 from the actuating fluid source 42 causes linear distension of the hydraulic cylinder in a manner elevating the particular harvesting unit to a raised position.

An advantage of the present invention being that elevation of the harvesting unit to a raised position can be effected through selective actuation of a switch conveniently arranged in the cab of the harvester. Notably, the elevation of a particular harvesting unit does not adversely affect the actuating fluid directed toward the other remaining fluid pressure actuators through the fluid flow circuits associated therewith. Thus, the height control sensing associated with the other harvesting units remains effective to maintain the other harvesting units in a predetermined disposition relative to the frame of the harvester.

The control system 40 of the present invention further controls the descent of a harvesting unit through the valve assembly 100. Valve assembly 100 allows a relatively quick descent of the harvesting unit in a controlled manner through use of the orifice 104.

An important feature of the present invention concerns the ability to elevate harvesting unit to a maximum height while maintaining the other harvesting units in an operational position under the influence of the height sensing system 60. Moreover, the arrangement of the fluid flow circuits in parallel relationship with each other maintains a substantially equal flow of actuating fluid to each of the fluid pressure actuators throughout the range of travel of the harvesting units.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A lift system for a cotton harvester having a chassis with a head assembly connected thereto, said head assembly including at least two harvesting units mounted for independent rocking movement relative to each other, said lift system comprising:
   a source of actuating fluid;
   a fluid pressure actuator connected to each harvesting unit for elevating the respective harvesting unit about a generally horizontal axis; and
   a hydraulic control system operatively connected between said source of actuating fluid and each fluid pressure actuator to supply a regulated flow of actuating fluid between the source of actuating fluid and each fluid pressure actuator and to selectively and independently control the elevation of the harvesting units relative to the chassis of the harvester, said control system including height sensors for individually maintaining each harvesting unit in a preselected elevational position relative to the harvester and a series of electro/hydraulic valves, with one electro/hydraulic valve being disposed to control the flow of actuating fluid between the source of actuating fluid and a respective fluid relative to the other fluid pressure actuators thereby providing independent control over elevation of one harvesting unit while maintaining other harvesting units on the head assembly in their preselected elevational position relative to the harvester.

2. The lift system for a cotton harvester according to claim 1 wherein each fluid pressure actuator includes a distendable hydraulic cylinder whose operative length controls the elevation of the harvesting unit connected thereto.

3. The lift system for a cotton harvester according to claim 1 further including fluid pressure actuators connected to said source of actuating fluid for vertically moving the head assembly and thereby conjointly elevating all the harvesting units thereon.

4. A lift system for a cotton harvester having a chassis with a harvesting head assembly at a forward end thereof, a plurality of harvesting units arranged on the head assembly for independent elevational movement relative to each other, said lift system comprising:
   a source of actuating fluid;
   a fluid pressure actuator connected to each harvesting unit for elevating the respective harvesting units through a range of travel extending between an operative position and a raised position; and
   a hydraulic control system connected to said source of actuating fluid for selectively elevating the harvesting units relative to the harvester and maintaining an equal flow of actuating fluid toward each of said fluid pressure actuators throughout the range of travel of the harvesting units, said control system comprising individual hydraulic circuitry for directing a regulated supply of actuating fluid to each fluid pressure actuator, sensors arranged in combination with said hydraulic circuitry to individually adjust the elevation of each harvesting unit as a function of ground contours over which the harvester moves, and individual electro/hydraulic valves arranged in combination with said hydraulic circuitry and in series with said sensors for influencing operation of the fluid pressure actuators independently of each other thereby allowing independent elevation of the harvesting units to a raised position while maintaining other harvesting units in an operative position under the influence of said sensors.

5. The lift system for a cotton harvester according to claim 4 wherein said source of actuating fluid includes a variable displacement pump responsive to the fluid actuating pressure provided to each fluid pressure actuator.

6. The lift system according to claim 4 further including a fluid pressure actuator mechanism for vertically moving said head assembly relative to said harvester thereby conjointly elevating the harvesting units thereon, said actuator mechanism including a pair of hydraulically actuated drivers arranged in a master/slave relation relative to each other.

7. A lift system for a cotton harvester having a chassis with a harvesting head assembly connected thereto, a plurality of harvesting units arranged on the head assembly for elevational movements relative to the chassis, said lift assembly comprising:
   a source of pressurized actuating fluid;
   a fluid pressure actuator connected to each harvesting unit for elevating the respective harvesting unit relative to the chassis of the harvester; and
   a valve body connected to said source of actuating fluid and including a series of individual hydraulic flow circuits through which regulated and substantially equal flows of hydraulic fluid are normally directed between the fluid pressure source and each fluid pressure actuator regardless of the relative elevation of the harvesting units, each hydraulic flow circuit including a signal receiving mechanism for individually adjusting flow through a respective circuit thereby controlling the elevation of the respective harvesting unit as a function of the position of a signal transmitter on said respective harvesting unit, a flow control mechanism for controlling the rate at which each harvesting unit is lowered, and a solenoid actuated valve interposed in each flow circuit for selectively controlling hydraulic flow thereby allowing for independent control over the elevation of a respective harvesting unit relative to other harvesting units on the head assembly.

* * * * *

UNITED STATES PATENT AND TRADEMARK OFFICE
CERTIFICATE OF CORRECTION

PATENT NO. : 5,237,802
DATED : August 24, 1993
INVENTOR(S) : Robert M. Fachini; John H. Chance; David Brandt; and Daniel A. Miller It is certified that error appears in the above-identified patent and that said Letters Patent is hereby corrected as shown below:

```
                                     (First Occurrence)
Column 9, Claim 1, line 32, after "fluid" insert -- pressure
                            actuator independent of the
                            regulated flow of actuating fluid --.
```

Signed and Sealed this

Eighth Day of March, 1994

Attest:

BRUCE LEHMAN

Attesting Officer

Commissioner of Patents and Trademarks